(No Model.)

M. R. MOSS.
SAP BUCKET COVER.

No. 502,740. Patented Aug. 8, 1893.

WITNESSES

INVENTOR
Marvin R. Moss
by
ATTORNEY

UNITED STATES PATENT OFFICE.

MARVIN R. MOSS, OF HUNTSBURG, OHIO.

SAP-BUCKET COVER.

SPECIFICATION forming part of Letters Patent No. 502,740, dated August 8, 1893.

Application filed October 24, 1892. Serial No. 449,822. (No model.)

*To all whom it may concern:*

Be it known that I, MARVIN R. MOSS, a citizen of the United States, residing at Huntsburg, in the county of Geauga and State of Ohio, have invented certain new and useful Improvements in Sap-Bucket Covers; and I do hereby declare the following to be a full, clear, and exact description of the invention, such as will enable others skilled in the art to which it appertains to make and use the same.

My invention relates to improvements in covers or protectors for sap buckets, designed to exclude rain, snow and leaves from the buckets, and to be more convenient and efficient than the covers now used; and it consists in the construction, arrangement and combination of parts hereinafter described and pointed out in the claims.

Figure 1:
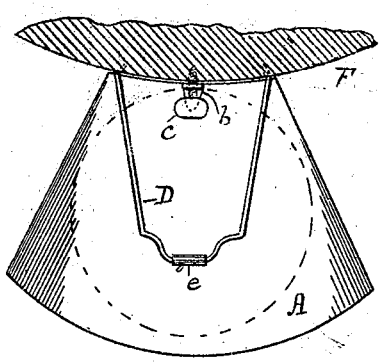
Figure 2:
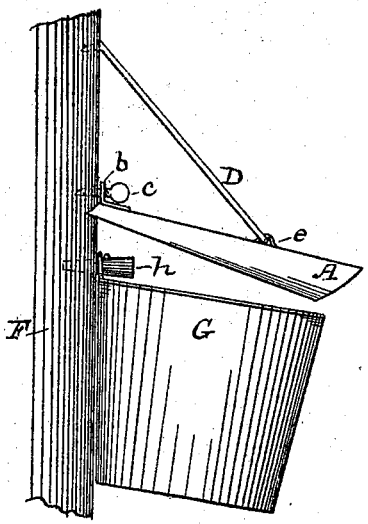
Figure 3:
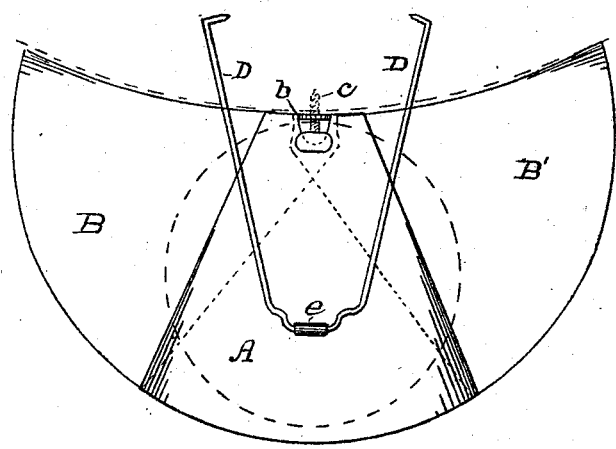
Figure 4:
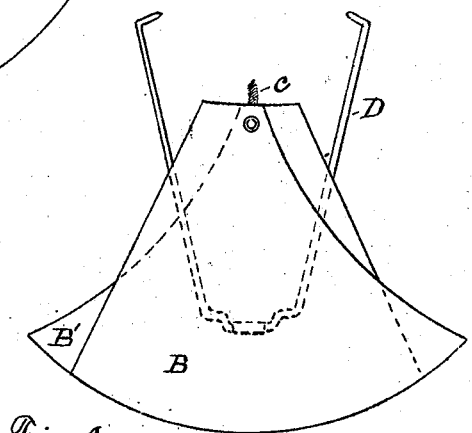

In the drawings Figure 1 is a plan view, and Fig. 2 a side view of the device in its simplest form attached to a tree as in use. Fig. 3 is a plan view of a modified form of the device, detached and extended as in use, and Fig. 4 is a plan view of the under side of the same folded for packing or transportation.

The improvement consists primarily in forming the cover to fit the tree as well as the bucket, and providing means for readily and detachably securing the same to the tree, independent of the spile or bucket, and maintaining it securely in position; and secondarily in making the cover adjustable to fit different sized trees or buckets and so as to fold up compactly for stowing yet capable of covering a considerable area when extended.

A represents a curved covering-piece which is provided at its inner side, which fits against the tree, with a lug $b$, perforated, and preferably provided with a gimlet pointed thumb screw $c$, by which the cover may be affixed to the tree. Instead of the thumb screw a tack, nail, or common wood screw may be used, but is less convenient. As thus secured the cover will be held in place over the bucket, but will be liable to be shaken about by high winds, and possibly to be loosened or displaced thereby or by the tipping up of the bucket in pouring out the sap. I therefore provide as additional means of fastening the cover in place a bail D, which is secured to the cover A by a loop $e$ or equivalent means, and has its free ends divergent and bent inward and pointed at their extremities so as to be readily driven into the bark of the tree above the cover, as seen in Fig. 2, whereby the cover is braced at two widely separated points and securely prevented from displacement.

F represents the tree, G the sap bucket, and $h$ the spout or "spile" on which it is hung. In this, the simplest form of the device, the cover is made of a single piece large enough to cover the bucket, and to be thoroughly efficient against driving storms of snow or rain it must be of somewhat greater area than the top of the bucket, and while it may be flat is preferably curved downward somewhat at its outer corners, as seen in Fig. 2. To secure cheapness of construction by the use of smaller pieces, and also to secure a closer fit to the tree, as well as a better fit for different sized trees or buckets, I prefer to make the cover adjustable or extensible by making the cover A smaller than is required to cover the bucket and adding wing-pieces B B' at each side, arranged to fold or slide upon the central piece A, for more convenient storage, and to be unfolded or extended to any extent required to completely cover and protect the bucket and at the same time closely fit the tree whatever its size. The wing-pieces B B' are of approximately triangular shape, preferably pivoted to the central piece A and curved on one side, as seen in Fig. 3, to enable them to fit the tree when turned out so as to abut against it.

Covers for sap buckets have before been used, but are usually attached when in use directly to the bucket, and are removed and replaced whenever the buckets are emptied, which is from one to several times a day, and I am not aware that any cover or protector for sap buckets has ever been used attached to the tree, entirely independent of both the bucket and the spile. By my improvement the cover remains unmoved during the entire season of sugar making.

The covers are attached to the tree at the time of tapping or afterward; the lug $b$ being placed against the tree just above the spout or spile, and the thumb screw $c$, or other fastening such as a tack or nail, inserted through the perforation in the lug and driven firmly home. The bail D is then turned up against the tree, the cover adjusted at a proper slope to shed rain, and the sharp ends of the bail are driven into the bark to hold the cover firmly in place and prevent its moving: the pail being hung on the spile either before or after the cover is affixed. In case the adjustable form of cover is used, after affixing the cover and hanging up the pail, the wing-pieces B B' are opened out to cover the pail and abut against the tree, as shown in Fig. 3, in which the tree and sap bucket are indicated by dotted lines. When thus arranged the full bucket can be emptied, or one bucket substituted for another, without disturbing the cover.

What I claim as my invention, and desire to secure by Letters Patent, is—

1. A sap bucket protector disconnected from the bucket and having a curved side with a perforated lug adjoining the same, a screw adapted to pass through the lug and enter the tree, and a bail secured at its middle to the cover and having its divergent free ends pointed and adapted to be driven into the tree, substantially as described.

2. The combination in a sap bucket protector of a main section provided with means of attachment to the tree, and extensible sections folding upon the main section and adapted when extended to cover and protect the bucket, substantially as described.

3. The combination in a sap bucket protector of a main section provided with means of attachment to the tree, and extensible sections pivoted to the main section and having curved edges to fit the tree, substantially as described.

4. The combination of a main section having a lug and thumbscrew and a hooked bail for attaching the cover to a tree, and wing-sections pivoted to the main section and having a curved side to fit the tree when extended, substantially as described.

In testimony whereof I hereto affix my signature in presence of two witnesses.

MARVIN R. MOSS.

Witnesses:
H. P. KILE,
A. W. STRONG.